United States Patent
Luo et al.

(10) Patent No.: US 8,183,186 B2
(45) Date of Patent: May 22, 2012

(54) CEMENT-BASED PARTICULATES AND METHODS OF USE

(75) Inventors: Hongyu Luo, Duncan, OK (US); Lewis R. Norman, Duncan, OK (US); Ronald J. Powell, Duncan, OK (US); Rajesh K. Saini, Duncan, OK (US); Ashok K. Santra, Duncan, OK (US); Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 676 days.

(21) Appl. No.: 12/290,986

(22) Filed: Nov. 5, 2008

(65) Prior Publication Data

US 2009/0139719 A1   Jun. 4, 2009

Related U.S. Application Data

(63) Continuation-in-part of application No. 11/388,645, filed on Mar. 24, 2006, which is a continuation-in-part of application No. 10/775,348, filed on Feb. 10, 2004, now Pat. No. 7,086,466.

(51) Int. Cl.
*E21B 43/26* (2006.01)
*E21B 43/267* (2006.01)
*C09K 8/42* (2006.01)

(52) U.S. Cl. ........ 507/269; 507/219; 507/221; 507/229; 507/230; 507/231; 166/280.2

(58) Field of Classification Search ......................... None
See application file for complete search history.

(56) References Cited

U.S. PATENT DOCUMENTS

| | | | |
|---|---|---|---|
| 2,857,286 A | 10/1958 | Striker | |
| 2,933,135 A | 4/1960 | Johnson | 166/42 |
| 2,952,318 A | 9/1960 | Ritch | |
| 2,959,223 A | 11/1960 | Harmon et al. | |
| 2,978,024 A | 4/1961 | Davis | |
| 3,026,938 A | 3/1962 | Huitt et al. | 166/42 |
| 3,219,112 A | 11/1965 | Sauber et al. | |
| 3,336,979 A | 8/1967 | Ingraham et al. | 166/33 |
| 3,353,601 A | 11/1967 | Dollarhide et al. | 166/33 |
| 3,366,177 A | 1/1968 | Powers et al. | |

(Continued)

FOREIGN PATENT DOCUMENTS

WO   WO 97/05079   2/1997

(Continued)

OTHER PUBLICATIONS

"Effect of the particle size on the micro and nanostructural features of calcium phosphate cement: a kinetic analysis", Biomaterials 25 (2004) 3453-3462.*

(Continued)

*Primary Examiner* — John J Figueroa
(74) *Attorney, Agent, or Firm* — Robert A. Kent; Tumey L.L.P.

(57) ABSTRACT

Methods of making particulates for use in a subterranean application comprising: providing particulates of a settable composition comprising a cementitious material, a filler material, and an activator of the cementitious material; and pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline phase.

20 Claims, 8 Drawing Sheets

U.S. PATENT DOCUMENTS

| | | | |
|---|---|---|---|
| 3,607,326 A | 9/1971 | Serafin | |
| RE27,271 E | 1/1972 | Hamsberger et al. | |
| 3,854,985 A | 12/1974 | Suzuki et al. | |
| 3,888,311 A | 6/1975 | Cooke, Jr. | 166/280 |
| 3,958,638 A | 5/1976 | Johnson | |
| 4,142,910 A | 3/1979 | Kraemer et al. | |
| 4,202,795 A | 5/1980 | Burnham et al. | |
| 4,284,433 A | 8/1981 | Aignesberger et al. | |
| 4,440,866 A | 4/1984 | Lunghofer et al. | 501/127 |
| 4,506,734 A | 3/1985 | Nolte | |
| 4,643,362 A | 2/1987 | Serafin | |
| 4,650,520 A * | 3/1987 | Johnsen et al. | 106/639 |
| 4,660,642 A | 4/1987 | Young | |
| 4,711,401 A | 12/1987 | Serafin | |
| 4,741,401 A | 5/1988 | Walles et al. | |
| 4,770,796 A | 9/1988 | Jacobs | |
| 4,848,973 A | 7/1989 | Yokota et al. | |
| 4,921,820 A | 5/1990 | Rumpf et al. | 501/128 |
| 4,961,790 A | 10/1990 | Smith et al. | |
| 5,102,558 A * | 4/1992 | McDougall et al. | 507/260 |
| 5,121,795 A * | 6/1992 | Ewert et al. | 166/292 |
| 5,123,487 A * | 6/1992 | Harris et al. | 166/277 |
| 5,127,473 A * | 7/1992 | Harris et al. | 166/277 |
| 5,149,370 A * | 9/1992 | Olaussen et al. | 166/292 |
| 5,151,203 A | 9/1992 | Riley et al. | |
| 5,203,629 A | 4/1993 | Valle et al. | |
| 5,236,501 A | 8/1993 | Nomachi et al. | |
| 5,253,991 A | 10/1993 | Yokota et al. | |
| 5,263,542 A * | 11/1993 | Brothers | 166/293 |
| 5,292,512 A | 3/1994 | Schaefer et al. | |
| 5,320,851 A | 6/1994 | Mars et al. | |
| 5,346,012 A * | 9/1994 | Heathman et al. | 166/293 |
| 5,358,047 A | 10/1994 | Himes et al. | |
| 5,389,706 A * | 2/1995 | Heathman et al. | 166/293 |
| 5,398,759 A * | 3/1995 | Rodrigues et al. | 166/293 |
| 5,551,976 A | 9/1996 | Allen | |
| 5,603,961 A | 2/1997 | Suzuki et al. | |
| 5,728,209 A | 3/1998 | Bury et al. | |
| 5,766,323 A | 6/1998 | Butler et al. | |
| 5,795,060 A | 8/1998 | Stephens | |
| 6,027,561 A | 2/2000 | Gruber et al. | |
| 6,170,575 B1 | 1/2001 | Reddy et al. | |
| 6,245,142 B1 | 6/2001 | Reddy et al. | |
| 6,379,456 B1 | 4/2002 | Heathman et al. | |
| 6,457,524 B1 | 10/2002 | Roddy | 166/293 |
| 6,471,975 B1 | 10/2002 | Banovetz et al. | |
| 6,478,869 B2 | 11/2002 | Reddy et al. | |
| 6,494,951 B1 | 12/2002 | Reddy et al. | |
| 6,508,305 B1 | 1/2003 | Brannon et al. | |
| 6,554,067 B1 | 4/2003 | Davies et al. | |
| 6,582,819 B2 | 6/2003 | McDaniel et al. | 428/402 |
| 6,599,863 B1 | 7/2003 | Palmer et al. | |
| 6,610,139 B2 | 8/2003 | Reddy et al. | |
| 6,632,527 B1 | 10/2003 | McDaniel et al. | 428/402 |
| 6,645,288 B1 | 11/2003 | Dargaud et al. | |
| 6,648,962 B2 | 11/2003 | Berke et al. | 106/696 |
| 6,660,080 B2 | 12/2003 | Reddy et al. | |
| 6,689,208 B1 | 2/2004 | Brothers | |
| 6,772,838 B2 | 8/2004 | Dawson et al. | 166/280 |
| 6,874,578 B1 * | 4/2005 | Garnier et al. | 166/293 |
| 6,883,609 B2 * | 4/2005 | Drochon et al. | 166/292 |
| 7,032,644 B2 | 4/2006 | Lord et al. | 166/276 |
| 734,110 A1 | 7/2006 | Roddy | |
| 7,086,466 B2 | 8/2006 | Roddy | 166/280.1 |
| 7,267,171 B2 | 9/2007 | Dusterhoft et al. | 166/280.1 |
| 7,270,879 B2 * | 9/2007 | McCrary | 428/402 |
| 7,279,447 B2 | 10/2007 | Lai et al. | |
| 7,308,939 B2 | 12/2007 | Welton et al. | 166/280.2 |
| 7,341,104 B2 | 3/2008 | Roddy | 166/280.2 |
| 7,424,913 B2 | 9/2008 | Roddy | |
| 2002/0004464 A1 | 1/2002 | Nelson et al. | |
| 2002/0048676 A1 | 4/2002 | McDaniel et al. | 428/404 |
| 2002/0193257 A1 | 12/2002 | Lee et al. | |
| 2003/0089281 A1 | 5/2003 | Berke et al. | |
| 2003/0134751 A1 | 7/2003 | Lee et al. | |
| 2003/0168215 A1 * | 9/2003 | Drochon et al. | 166/276 |
| 2003/0234103 A1 * | 12/2003 | Lee et al. | 166/293 |
| 2004/0261999 A1 | 12/2004 | Nguyen | 166/292 |
| 2005/0019574 A1 * | 1/2005 | McCrary | 428/403 |
| 2005/0022991 A1 | 2/2005 | Rao | 166/280.2 |
| 2005/0080176 A1 | 4/2005 | Robb | 524/424 |
| 2005/0096207 A1 | 5/2005 | Urbanek | |
| 2005/0173117 A1 | 8/2005 | Roddy | 166/293 |
| 2006/0016598 A1 | 1/2006 | Urbanek | |
| 2006/0204756 A1 | 9/2006 | Welton et al. | 428/407 |
| 2009/0124522 A1 | 5/2009 | Roddy | |
| 2010/0071901 A1 * | 3/2010 | Luo et al. | 166/280.2 |

FOREIGN PATENT DOCUMENTS

| | | | |
|---|---|---|---|
| WO | WO 00/49272 | | 8/2000 |
| WO | WO 0050357 A1 * | | 8/2000 |
| WO | WO 0187796 A1 * | | 11/2001 |
| WO | WO 2004/001188 A1 | | 12/2003 |
| WO | WO 2005/080287 | | 8/2005 |

OTHER PUBLICATIONS

USPTO Office Action for U.S. Appl. No. 11/388,645 dated Jul. 30, 2009.

U.S. Appl. No. 12/263,954, filed Nov. 5, 2008, Roddy.

Foreign communication from a related counterpart application dated Jul. 5, 2005.

Office Action from U.S. Appl. No. 10/775,348 dated Nov. 23, 2005.

Office Action from U.S. Appl. No. 10/775,348 dated May 2, 2006.

Notice of Allowance from U.S. Appl. No. 10/775,348 dated Jun. 6, 2006.

Foreign communication from a related counterpart application dated Jun. 29, 2007.

Smith, Dwight "Cementing" Revised Edition, Second Printing 1990.

Notice of Allowance from U.S. Appl. No. 11/388,644 dated Jan. 3, 2008.

Office Action from U.S. Appl. No. 12/008,923 dated May 20, 2008.

Notice of Allowance from U.S. Appl. No. 12/008,923 dated Jul. 22, 2008.

Office Action from U.S. Appl. No. 11/388,645 dated Apr. 3, 2009.

*API Recommended Practices for Testing Sand Used in Hydraulic Fracturing Operations*, issued by American Petroleum Institute, API RP 56, First Edition, Mar. 1983.

Carbolite® Data Sheet, *Lightweight, High Performance Proppant*, Carbo Ceramics, 2006.

Wang, et al., *Deformation mechanisms in nacre*, J. Mater. Res., vol. 16, No. 9, pp. 2485-2493, Sep. 2001.

Abdala, et al., *Inspired by Abalone Shell: Strengthening of Porous Ceramics with Polymers*, Polymeric Materials: Science & Engineering 2004, 90, 384-385, 2004.

Deville, et al., *Freezing as a Path to Build Complex Composites*, Science, vol. 311, pp. 515-518, www.sciencemag.org, Jan. 27, 2006.

Halloran, *Making Better Ceramic Composites with Ice*, Science, vol. 311, pp. 479-480, www.sciencemag.org, Jan. 27, 2006.

USPTO Office Action for U.S. Appl. No. 11/388,645 dated Dec. 10, 2009.

USPTO Office Action for U.S. Appl. No. 11/388,645, dated Aug. 17, 2010.

* cited by examiner

CEMENT-BASED PARTICULATES AND METHODS OF USE

CROSS REFERENCE TO RELATED APPLICATIONS

The present application is a continuation-in-part of U.S. patent application Ser. No. 11/388,645, filed on Mar. 24, 2006, titled "Subterranean Treatment Fluids Comprising Substantially Hydrated Cement Particulates," which is a continuation-in-part of U.S. patent application Ser. No. 10/775,348, filed on Feb. 10, 2004 and issued Aug. 8, 2006 as U.S. Pat. No. 7,086,466, titled "Use of Substantially Hydrated Cement Particulates in Drilling and Subterranean Applications," the disclosures of which are incorporated herein by reference in their entirety.

BACKGROUND

The present invention generally relates to improved particulates and methods of using such particulates in subterranean applications. More particularly, in certain embodiments, the present invention relates to particulates comprising a cementitious material and a filler material, methods of preparing those particulates, and associated methods of using the particulates in subterranean applications.

Hydraulic fracturing is a process commonly used to increase the flow of desirable fluids, such as oil and gas, from a portion of a subterranean formation. Hydraulic fracturing operations generally involve introducing a treatment fluid commonly referred to as a fracturing fluid into a subterranean formation at a pressure sufficient to create or enhance one or more fractures in the formation. Enhancing a fracture includes enlarging a pre-existing fracture in the formation. The fracturing fluid may comprise particulates, often referred to as "proppant" that are deposited in the fractures. The proppant may function to prevent the fractures from fully closing upon the release of pressure, forming conductive channels through which fluids may flow to (or from) the well bore.

Another process that involves the use of particulates is gravel packing. A "gravel pack" is a term commonly used to refer to a volume of particulate materials (such as sand) placed into a well bore to at least partially reduce the migration of unconsolidated formation particulates into the well bore. Gravel packing operations commonly involve placing a gravel pack screen in the well bore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed.

Conventional particulates included as proppant and/or gravel in subterranean treatment fluids include, but are not limited to: sand; bauxite; ceramic materials; glass materials; polymer materials; TEFLON® (polytetrafluoroethylene) materials; nut shell pieces; seed shell pieces; fruit pit pieces; wood; composite particulates; cured resinous particulates comprising nut shell pieces, seed shell pieces, inorganic fillers, and/or fruit pit pieces; and combinations thereof. Conventionally, composite particulates that may be used comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

The specific gravity of conventional particulates is often so high as to make it difficult to suspend the particulates in unviscosified treatment fluids. As a result, viscosifiers are often added to treatments fluids such as fracturing fluids and gravel packing fluids. Such viscosifiers may be expensive and may have an adverse impact on production stimulation and well completion operations. One example of an adverse impact may be that at the high concentrations of viscosifier needed to suspend traditional high strength particulates, the viscosifier may contribute to a reduction in the conductivity of the subterranean formation. The suspension of conventional particulates in a treatment fluid may also raise the overall density of the treatment fluid to an undesirable level. When the treatment fluid is injected into a well bore, e.g., during a gravel packing operation, the high hydrostatic pressure applied to the well bore may result in unwanted fracturing of the subterranean formation.

While some conventional particulates such as walnut hulls and their composite particulates have a relatively low specific gravity, those particulates are generally unable to withstand significant closure stresses over time at elevated subterranean temperatures. This may be a disadvantage when using low strength particulates as proppant in a fracturing fluid since it allows the cracks to close, thereby reducing the conductivity of the fracture. Similarly, a variety of lightweight particulates formed of thermoplastic materials including polyolefins, polystyrene divinylbenzene, polyfluorocarbons, polyethers etherketones and polyamide imides are commercially available. However, when these particles are exposed to temperatures above about 150° F., they often soften and deform, and may not be suitable in all well bores.

There may also be difficulties associated with obtaining and/or manufacturing some conventional particulates. For instance, sand proppants are usually only mined in certain areas of the world and may not be available globally. Bauxite ceramic proppant, which may have a desirably higher crush strength than sand, is a man-made material that is typically sintered at high temperatures, e.g., temperatures of about 1500° C. Particulates such as bauxite which must be cured at high temperatures may require the use of specialized sintering kilns. These processes consume large amounts of energy. Bauxite may also be more expensive than sand. Proppants comprising a binder comprised of resin are known and may have an advantageously lower density than bauxite, but may not be cost effective. Transporting sand proppants to job sites may be difficult and expensive.

SUMMARY

The present invention generally relates to improved particulates and methods of using such particulates in subterranean applications. More particularly, in certain embodiments, the present invention relates to particulates comprising a cementitious material and a filler material, methods of preparing those particulates, and associated methods of using the particulates in subterranean applications.

A method of making particulates for use in a subterranean application comprising providing particulates of a settable composition comprising a cementitious material, a filler material, and an activator of the cementitious material; and pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline phase. As used herein, the term "crush strength" refers to crush strength as described in *Recommended Practices for Testing Sand Used in Hydraulic Fracturing Operations,* First ed., 1983.

A cement particulate that comprises a cementitious material and a filler material, wherein the particulate is produced through a process comprising forming particulates that comprise a settable composition comprising the cementitious material, the filler material, and an activator of the cementitious material; pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline phase.

A subterranean treatment fluid comprising a plurality of particulates that comprise a cementitious material and a filler material, wherein the particulates are produced through a process comprising forming particulates that comprise a settable composition comprising the cementitious material, the filler material, and an activator of the cementitious material; pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline structure.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
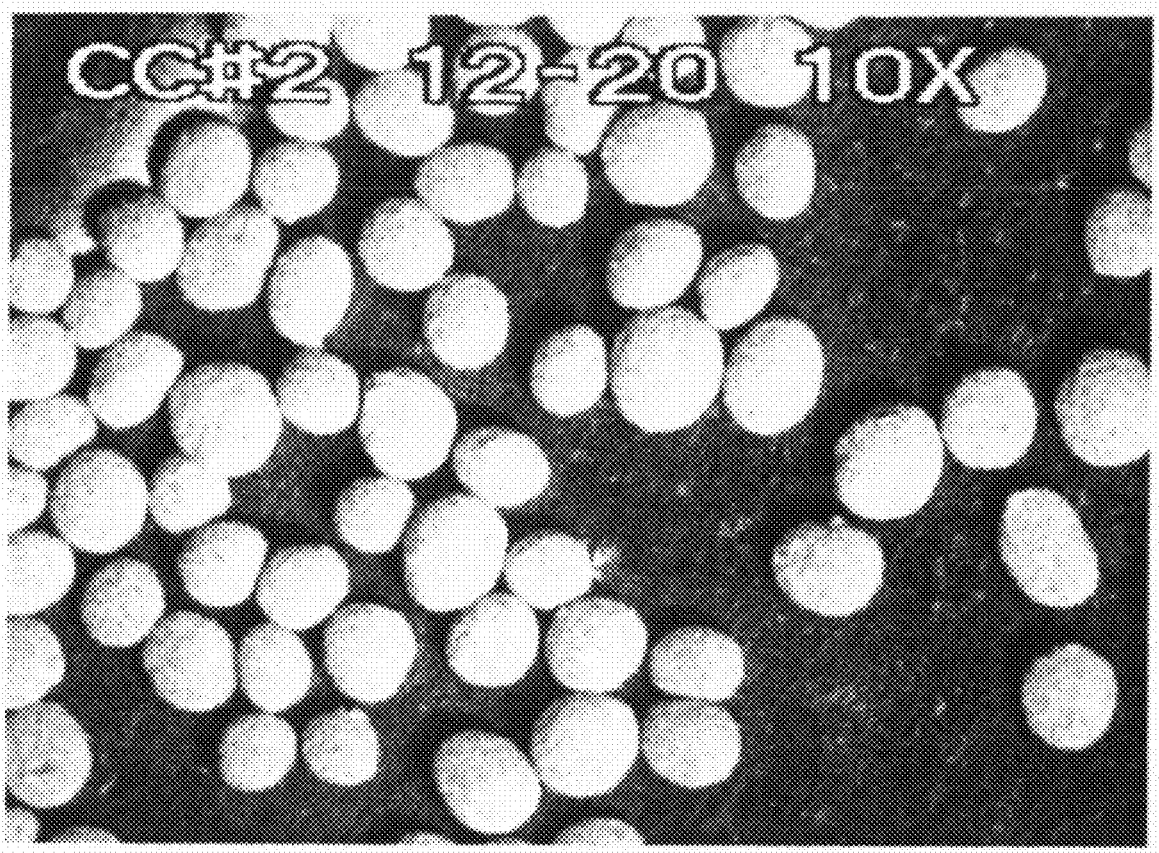
FIG. 1 shows a magnified image of cement particulates that represent an embodiment of the present invention.

The present invention generally relates to improved particulates and methods of using such particulates in subterranean applications. More particularly, in certain embodiments, the present invention relates to particulates comprising a cementitious material and a filler material, methods of preparing those particulates, and associated methods of using the particulates in subterranean applications.

Of the many potential advantages of the particulates of the present invention, one advantage may be that the particulates may be a cost effective alternative to high quality sand, which may be available in limited supply and/or may be cost-prohibitive for use in certain applications. In some embodiments, the particulates of the present invention may have a crush strength that is significantly higher than similarly sized sand particulates, e.g., approaching or exceeding twice the crush strength of similarly sized sand particulates.

Another advantage of some embodiments of the particulates of the present invention may be that, because the particulates may have a lower specific gravity than conventional particulates, the particulates may be suspended in treatment fluids having a lower viscosity than treatment fluids that have frequently been used to suspend conventional particulates. This may be advantageous because treatment fluids that contain smaller amounts of viscosifying agents may be less likely to reduce the permeability of a formation. Additionally, when particulates of the present invention are suspended in a treatment fluid, the treatment fluid may have an overall lower density than some prior art particulate-containing fluids. A treatment fluid having a lower overall density may be desirable because such a treatment fluid may result in lower hydrostatic pressure in a well bore and therefore present a lower risk of inadvertent fracturing of the well bore during certain operations, e.g., gravel packing operations.

Yet another potential advantage of the particulates of the present invention may be that in some cases they are an environmentally acceptable alternative to resin-based proppants. Another advantage may be that some of the particulates of the present invention may be made using readily available cementitious materials, e.g., local cementitious materials and/or industrious waste cementitious materials such as fly ash, slag, and the like, which may reduce the cost of the particulates relative to other available alternatives. Also, because cements are frequently graded according to various standards, it may be easier to control the quality of cement-based particulates than particulates made from other unconventional cementitious materials. In addition, production of the particulates of the present invention may not always require the use of specialized sintering kilns. Other benefits and advantages of the present invention will be apparent to one of ordinary skill in the art.

In one aspect, the present invention provides cement particulates that comprise a cementitious material and a filler material, wherein the particulates have been cured at a temperature up to about 600° F. In some embodiments, the present invention provides cement particulates that comprise a cementitious material and a filler material, wherein the particulate is produced through a process comprising forming particulates that comprise a settable composition comprising the cementitious material, the filler material, and an activator of the cementitious material; pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline phase.

Generally, the cementitious material which is included in the particulates of the present invention may be any cementitious material that sets and hardens after contacting an activator of that cementitious material. For example, a hydraulic cement sets and hardens through a hydration reaction with water. The term "activator" does not require any particular degree of chemical reaction between the activator and the cementitious material. A variety of cementitious materials are suitable for use, including those comprising calcium, aluminum, silicon, oxygen, sulfur, or a combination of any of these materials. Cementitious materials which may be suitable for use in the particulates of the present invention include, but are not limited to Portland cements, pozzolanic materials (e.g., fly ash, slag, calcined metakaolin, and the like) which set upon the addition of an alkali activator or an acid activator, geopolymer cements (e.g., alkali- or acid-activated alumino silicate cement), phosphate cements (e.g., cements that undergo a phosphate reaction with a metal oxide activator or a pozzolan activator), gypsum cements, aluminous cements, silica cements, alkaline cements, high content alumina cements, magnesium oxide cements, acid resistant silicate cements, oxysalt cementitious systems (e.g., magnesium oxychloride, magnesium oxysulfate, Mg/Al oxysulfate, and the like), silico phosphate cements, glass phosphate cements, and mixtures thereof. After the cementitious material has activated by an activator of the cementitious material, the cementitious material is capable of acting as a binder that binds together particles of filler material.

The filler material that is included in the cement particulates of the present invention may comprise, but is not limited to, mineral compounds such as silica, alumina, bauxite, talc, zeolites, feldspar, kaolin and slags; man-made compounds such as hollow glass beads, glass fibers, and zeolites; organic compounds such as nut shells and carbon fibers; and combinations thereof. In exemplary embodiments, the filler material may be in the form of a powder. In some embodiments, the filler material may be ground into fine particles before being combined with the cementitious material. In some embodiments, the filler material may comprise a pozzolanic powder such as fly ash. In some embodiments in which the cementitious material is a hydratable cement, a pozzolanic powder may react with water and lime generated by cement hydration. Pozzolanic powders may tend to increase the strength and durability of the final composite. Pozzolanic powders maybe mixed with the cementitious material and/or other filler materials.

The properties of the cement particulates of the present invention may be influenced by the filler material(s) chosen. For example, fillers such as porous glass beads, zeolites and nut shells may result in lower density particulates. Fillers that comprise inorganic compounds may result in higher strength particulates. Similarly, reactive fillers such as silica, including high surface area silica, may result in stronger proppants and/or accelerate the curing of the proppants. Reactive fillers may react with the cementitious material to form a strong interface so that a strong bond forms between the cementitious material and the filler material. Non-reactive fillers, such as some fibers or fly ash, may be less expensive and may, in some embodiments, lend strength to the resulting particulates, especially if the non-reactive fillers are evenly distributed throughout each particulate.

In some embodiments, the filler material may be a lightweight filler material. A variety of lightweight filler materials may be suitable for use in the particulates of the present invention. In some embodiments, hollow microspheres may be used as a lightweight filler in accordance with the present invention. Examples of hollow microspheres which may be suitable include, but are not limited to, hollow mineral glass spheres that are commercially available under the tradename "SPHERELITES™" from Halliburton Energy Services of Duncan, Okla.; hollow cenospheres formed of silica and alumina filled with low pressure gases commercially available under the trade designation "CENOLIGHT®" from Microspheres, S.A.; hollow microspheres that are formed of glass and are commercially available under the trade designation "SCOTCHLIGHT™" from the 3M Company of St. Paul, Minn.; microspheres formed of ceramic material that are commercially available under the trade designation "Z-LIGHT SPHERES™" from the 3M Company of St. Paul, Minn.; and microspheres formed of a polymeric material that are commercially available under trade designation "EXPANCEL®" from Akzo Nobel of the Netherlands. The crush strengths, true densities and particle sizes of certain "SCOTCHLIGHT™" and "Z-LIGHT SPHERES™" hollow microspheres are set forth in the Table 1 below.

TABLE 1

Example Hollow Microsphere Properties

| Hollow Microspheres | Strength (psi) | True Density (g/cc) | Particle Size (microns) |
|---|---|---|---|
| "SCOTCHLIGHT ™" Glass Bubble General Purpose Series[1] | | | |
| K32 | 2,000 | 0.32 | 20 |
| K37 | 3,000 | 0.37 | 20 |
| S38 | 4,000 | 0.38 | 15 |
| K46 | 6,000 | 0.46 | 15 |
| S60 | 10,000 | 0.60 | 10 |
| "SCOTCHLIGHT ™" Glass Bubble Floated Purpose Series[1] | | | |
| H20 | 1,000 | 0.20 | 30 |
| D30 | 4,500 | 0.20 | 20 |
| H50 | 10,000 | 0.20 | 20 |
| "Z-LIGHT SPHERES ™" Ceramic Microspheres[1] | | | |
| G-3125 | 2,000 | 0.7 | 50 |
| G-3150 | 2,000 | 0.7 | 55 |
| G-3500 | 2,000 | 0.7 | 65 |

[1]Commercially available from 3M Company of St. Paul, MN.

Other suitable lightweight fillers may also include, but are not limited to, lightweight aggregates such as wood dust, walnut hulls, rice husks, expanded pearlites, fly ash, and mixtures thereof. The particulates of the present invention may comprise lightweight filler in an amount greater than 0% up to about 100% by weight of the cementitious material. In certain exemplary embodiments, the lightweight filler may be present in an amount in the range of about 10% to about 40% by weight of the cementitious material. In certain embodiments, the relative amounts of cementitious material and lightweight filler in a particulate may vary the properties of the particulate. For example, in some embodiments, a larger proportion of lightweight filler may lead to particles having a lower density and lower strength than similar particles having a smaller proportion of lightweight filler.

The particulates of the present invention may be formed in any suitable manner. In certain embodiments of the present invention, particulates are formed by providing a cementitious material, a filler material, and an activator of the cementitious material, combining the cementitious material, filler material, and an amount of activator sufficient to form a settable composition, forming a plurality of discrete particulates from the settable composition, and pre-curing the particulates until the particulates reach a crush strength of about 50 psi or greater, and then curing the pre-cured particulates at a temperature in the range of about 230° F. to about 600° F. for several hours or up to a few days. In exemplary embodiments, pre-cured particulates can be handled without damaging them. The pre-cure time depends on the particulate composition and the temperature of pre-cure step. The size of the cement particulates of the present invention may be varied based upon the desired use of the particulates. In certain embodiments, the cement particulates may have an average diameter in the range of about 150 micrometers to about 2.5 millimeters. However, it should be understood that, in other embodiments, the particulates may have an average diameter of greater than about 2.5 millimeters or less than about 150 micrometers as desired for a particular application. One of ordinary skill in the art with the benefit of this disclosure will know the appropriate size of particulates for a particular application.

In some embodiments, discrete particulates are formed from a settable composition comprising a cementitious material, a filler material, and an activator by granulating the settable composition through spraying, mixing, or the like. Exemplary methods of forming the particulates of the present invention may involve methods adapted from U.S. Pat. No. 4,440,866 issued to Lunghofer et al. and/or U.S. Pat. No. 4,921,820 issued to Rumpf et al., the disclosures of which are hereby incorporated by reference. One adaptation of U.S. Pat. No. 4,440,866 that may be used to make the particulates of the current invention comprises providing a mixture of a cementitious material, a filler material, and an activator, and atomizing the mixture through a pressure nozzle such that particulates are created. An adaptation of U.S. Pat. No. 4,921,820 that may be suitable involves dry mixing at least two of the dry components of the particulates in a mixer such as a compacting mixer and then adding a liquid, such as a cement activator or granulating agent, so that agglomeration occurs. According to some embodiments, liquid components may be added to dry components by any means known in the art, including, but not limited to, pumping or spraying.

In some embodiments, the particulates of the present invention may be formed by combining at least a cementitious material, a filler material, and a granulating agent to form an un-activated cement blend; forming a plurality of particulates from the un-activated cement blend; contacting the un-activated cement blend with an activator of the cement in an amount sufficient to activate a least a portion of the particulates such that the portion of the particulates become settable; pre-curing the particulates until the particulates reach a crush strength of about 50 psi or greater; and then curing the particulates at a temperature in the range of about 230° F. to about 600° F. so that at least a portion of the particulates comprise a newly formed crystalline phase. For example, at least a portion of the particulates may comprise a crystalline phase such as xonotlite, tabormorite, and/or the like, that forms in situ.

Granulating agents that may be suitable for use in forming an un-activated cement blend may be an organic glue and/or an anhydrous material. Example granulating agents include, but are not limited to, sodium silicate, starch solution, guar solution, polyvinyl alcohol, polyvinylpyrrolidone (PVP), and combinations thereof. In general the granulating agent, while it may comprise a small amount of an activator of the cementitious material, such as water, is present in the un-activated cement blend in an amount sufficient to enable the formation of cohesive particulates without causing the activation of the cementitious material into a settable composition. In order for particulates of an un-activated cement blend that are held together by a granulating agent to form particulates of a settable composition, the un-activated particulates must be exposed to a sufficient amount of an activator of the cement composition. The activated particulates are pre-cured and then cured at a temperature in the range of about 230° F. to about 600° F. so that at least a portion of the particulates comprise a newly formed crystalline phase. One advantage of using a granulating agent to form un-activated particulates before exposing the particulates to an activator may be that it can be possible to limit the amount of fluid present in the particulates which, after the pre-curing and/or curing step, results in particulates having less porosity.

In some embodiments, the particulates of the present invention may have a sphericity of 0.7 or higher, as described in API RP 56, *Recommended Practices for Testing Sand Used in Hydraulic Fracturing Operations,* First ed., 1983. In some embodiments, the particulates may have a roundness of 0.7 or higher, as described in the API RP 56 publication. Further, in some embodiments, the particulates of the present invention may have a crush strength that is appropriate for a propping a fracture in a hydrocarbon well. In some cases, the API crush strength is higher than 5000 psi. In some preferred embodiments, the particulates of the present invention may have a specific gravity lower than about 2.65. In some embodiments, the specific gravity of the particulates may be in the range of about 0.8 to about 3.5. Thus, the bulk density of the particulates of the present invention may be lower than that of the sand which is conventionally included in treatment fluids as proppant and/or gravel.

In certain embodiments, the activator for the cementitious material is combined with the cementitious material in an amount in the range of about 15% to about 200% by weight of the cementitious material. In certain embodiments, the activator may be added to the cementitious material, a filler material, an admixture, or both. In another embodiment, the activator may be incorporated in an aqueous dispersion, emulsion, or solution containing an admixture(s) that is included in the particulates.

In some embodiments, the activator for the cementitious material may comprise water. The water that is used can be fresh water, salt water (e.g., water containing one or more salts dissolved therein), brine (e.g., saturated salt water), or seawater. Generally, the water can be from any source, provided that it does not adversely affect other components in the settable composition. In some embodiments, water is combined with the cementitious material and/or filler material in an amount sufficient to hydrate the cementitious material. In some embodiments, the amount of water used to form the particulates may affect the porosity and/or the strength of the particulates. For example, in some embodiments, the more water used to form the particulates, the higher the porosity of the resulting particulates, and the lower the strength of the cured particulates. According to certain embodiments, other factors being equal, particulates having lower porosity and higher strength may be formed by using less water. In some embodiments the water may further comprise a friction reducer and/or a component to change the pH of the water.

In some embodiments, the cement particulates of the present invention may further comprise other additives. For example, the particulates may optionally comprise a friction reducer, a plasticizer, a water reducer, a set retarder, a set accelerant, a dispersant, a surfactant, basalt, organic fibers, inorganic fibers, silica ($SiO_2$), and/or pozzolanic materials such as silica fume, fly ashes, and pozzolanic slags. Fibers which may be suitable for use in particulates of the present invention include, but are not limited to, cellulose fibers, carbon fibers, glass fibers, and mixtures thereof. Fibrous fillers may be incorporated into the particulates to enhance the strength, hardness and toughness of the particulates. Such fibrous fillers include, but are not limited to, glass fibers, aramid synthetic fibers (KEVLAR® fibers), basalt fibers, wollastonite, carbon fibers, etc. In some embodiments, plasticizers may be used to reduce the water requirement of a cementitious material, e.g., in an amount of about 0.1 to about 7% by weight of the cementitious material.

In some embodiments, the particulates may comprise high surface area silica. In embodiments in which the particulates comprise silica, the silica may be present in an amount in the range of about 20% to about 400% by weight of the cementitious material. Whether particulates comprise silica may depend on the method in which the particulates are manufactured and the intended use for the particulates. In exemplary embodiments, silica is optional at temperatures below 230° F. However, in some embodiments, silica may be used at lower temperatures (e.g., temperatures less than 230° F.) to accelerate the degree of cement hydration. In some embodiments, the silica may enhance the strength of the particulates. At temperatures above about 230° F., silica may be used to prevent strength retrogression and produce desirable crystalline phases. At temperatures of about 400° F. and higher, at least 35% by weight silica may be used in accordance with embodiments of the present invention.

In some embodiments, the cement particulates of the present invention may comprise an admixture. By including an admixture in a settable composition which comprises cementitious material, filler material, and water, the particulates formed using this settable composition should comprise the admixture. In another embodiment, after discrete particulates are formed from a settable composition, the particulates may be coated with at least one admixture. This permits the combination of admixtures that may not be compatible when used in solution. Admixtures which may be used include fluid loss control additives, surfactants, salts, defoamers, formation conditioning agents, expanding additives, flow enhancing additives, acids, corrosion inhibitors, crosslinking agents, breakers, viscoelastic surfactants, friction reducers, gelling agents, biocides, algicides, and combinations thereof.

In some embodiments, the particulates of the present invention may be at least partially coated with an inert material. Such an inert coating may reduce the susceptibility of the particulates to acid dissolution. Inert materials that may be suitable for use as a coating include silica fumes, alumina fumes, and aluminum silicate. As used herein, the terms "coat," "coating," and their derivatives do not imply any minimum degree of coverage of the surface of a particulate. In some embodiments, an inert material may be used to coat the particulates after the particulates have formed and are still slightly wet, e.g., when the particulates are in the "green" phase, as that term will commonly be understood to a person of ordinary skill in the art. An inorganic inert material may be added to the slightly wet particulates while the particulates are rolled, or at another appropriate time.

In some embodiments, the particulates of the present invention may be at least partially coated with a resin. It is believed that a resin coating may increase the conductivity of the proppant pack. Also, in some embodiments, the particulates may comprise a polymer that infiltrates the particulates. As used herein, the term "infiltrate" refers to permeating a particulate by penetrating its pores, surface flaws, and/or interstices. The term "infiltrate" does not imply any particular degree of infiltration of the particulates with a polymer composition. In some embodiments, the infiltration of the particulates with a polymer may enhance the strength, e.g., the crush strength, of the particulates without increasing the specific gravity of the particulates. Although not wanting to be limited to any particular theory, it is believed that one mechanism of strength enhancement of the particulate may occur as a result of an interaction between the strengthening composition and the particulate, wherein the polymer composition becomes anchored at multiple sites within the particulate in a stitching manner. Interactions that may contribute to the strength enhancement mechanism include van der Waals forces, hydrogen bonding, covalent bonding, ionic bonding, and acid-base interactions. The particulates may then be suspended in a treatment fluid, and this treatment fluid may be placed into a subterranean formation. The particulates may be suspended in the treatment fluid by any suitable method as recognized by one skilled in the art with the benefit of this disclosure, including using a fracturing blender.

As mentioned above, porous particulates may be infiltrated with a polymer composition. Polymer infiltration of the particulates may be accomplished by a variety of methods. In one embodiment of the present invention melt infiltration may be used, wherein the particulates may be coated with a polymer and heated to a temperature sufficient to allow the polymer to flow and infiltrate the pores of the particulates. In one embodiment, this may comprise coating the particulates with a heated polymer melt and allow the polymer to flow and infiltrate the particulates. In another embodiment of the present invention, solvent infiltration may be used, wherein the particulates are evacuated, a solution containing the polymer composition is introduced, and the system is maintained under a vacuum. The solvent is removed afterward either by heating or by the application of vacuum leaving the polymer infiltrated in the pores of the particles. In one embodiment this may comprise evacuating the particulates at 25 mm Hg vacuum for one hour, introducing a solution containing the polymer composition through a dropping funnel, and maintaining the system under a 25 mm Hg vacuum for 15 minutes. The solvent is then removed either by heating or by the application of vacuum leaving the polymer infiltrated in the pores of the particles. In another embodiment of the present invention, monomer infiltration followed by in-situ polymerization may be carried out according to the following: the particulates are evacuated, the monomer is introduced in the pores of particulates, while the system is maintained under a vacuum, and in-situ polymerization of the monomer is initiated. In one embodiment this may comprise evacuating the particulates at 25 mm Hg vacuum for one hour, introducing the monomer through a dropping funnel, maintaining the system under a 25 mm Hg vacuum for 15 minutes, and initiating in-situ polymerization of the monomer. Additionally, polymer infiltration may be carried out by infiltration of oligomers, or comparably short polymer chains, followed by further polymerization in-situ.

In certain embodiments, the particulates may be infiltrated with a plurality of polymers. In such embodiments, one or more of melt infiltration and solvent infiltration may be used. In certain embodiments, a crosslinker may be incorporated to crosslink the infiltrated polymer(s). Generally, all particulates contain pores and/or surface flaws. Thus, a wide variety of particulates may be infiltrated with polymer, including high density porous particulates, low density porous particulates, and particulates that exhibit a negligible degree of porosity but contain surface flaws. Suitable particulates may have an internal porosity ranging from 0.01% to 80%.

Polymer compositions suitable for use in infiltrating particulates of the present invention should be capable of interacting with multiple sites within the pores or surface flaws of the particulate. Thus, generally any polymer that has a chain length greater than the size of the pore or surface flaw of the particulate into which the polymer has been infiltrated can enhance the strength of the particulates described herein. Polymer compositions suitable for use in the present invention may have a glass transition temperature ($T_g$) greater than the temperature of the environment in which the strengthened particulates will be used, e.g., the temperature of the subterranean formation. Polymer compositions suitable for use in the present invention may be insoluble in water and/or oil. Polymer compositions that are soluble in water and/or oil may be made less soluble in water and/or oil through crosslinking of the polymers. The polymers can be crosslinked after infiltration of polymers in the pores. When the particles are infiltrated by monomers, the crosslinking monomers may be added with the monomer and polymerized in situ to give a crosslinked polymer.

Suitable polymer compositions may include, for example, homopolymers, copolymers, and ionomers. Examples of homopolymers may include polystyrene, polypropylene, and polyvinyl alcohol, and poly(methyl methacrylate). If an ionomer is used, the ionic group may be anionic, cationic or zwitterionic. Thus, examples of suitable ionic groups include acrylate, acrylic acid, amine, quaternary amine, and amine carboxylate. If infiltration of the polymer composition is accomplished via the addition of a monomer followed by in situ polymerization, suitable monomers may include methyl methacrylate, butyl methacrylate, methacrylic acid, and 2-((methacryloyloxy)ethyl)trimethyl-ammonium chloride. Other examples of suitable polymers may include resin systems such as two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof.

Optionally, if infiltration of the polymer composition is accomplished via in-situ polymerization, a polymerization initiator may be used. The polymerization initiator may be used, inter alia, to initiate polymerization of monomers, oligomers, or mixtures thereof. Any compound or compounds which form free radicals in aqueous solution may be used as the primary initiator for the polymerization of ethylinically monomers. The free radicals act, inter alia, to initiate polymerization of the monomers. Compounds suitable for use as the polymerization initiator include, but are not limited to, alkali metal persulfates; peroxides; oxidation-reduction systems employing reducing agents, such as sulfites in combination with oxidizers; and azo polymerization initiators. Preferred azo polymerization initiators include 2,2'-azobis(2-methylpropionitrile), 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide. Generally, the polymerization initiator should be present in an amount sufficient to initiate polymerization of the monomers. In certain embodiments of the present invention, the primary initiator is present in an amount in the range of from about 0.1% to about 5% by weight of the composition to undergo in-situ polymerization.

In certain embodiments polymerization may be initiated by heating the monomers. In such embodiments, heat may be applied alone or in conjunction with an initiator. In some embodiments polymerization may be accomplish by coupling agents that couple oligomers and/or short polymers to form larger and/or more solid polymers. For embodiments of this type, the oligomers should be capable of reacting with the coupling reagent to produce the polymer or crosslinked polymer. For example, a diol can be reacted with isocyanate to form polyurethane.

Optionally, if a polymer composition is used, the polymer composition may further comprise a crosslinking agent for crosslinking the polymer composition in the desired porous particulate. In some embodiments, the crosslinking agent is a molecule or complex containing a reactive transition metal cation. A suitable crosslinking agent may comprise trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in the polymer compositions in an amount in the range of from 0.01% to about 5% by weight of the polymer composition. Polymerization of monomers may be accomplished by the addition of bis-ethylene substituted monomers to the polymerization monomers and polymerized in situ with free radical. Polymerization of an infiltrated polymer or polymer formed in situ may also be accomplished by addition of free radical initiators in the monomer solution to help in the polymerization by heating or any other suitable means, as will be apparent to a person of ordinary skill in the art.

In some embodiments, a polymer composition may be dissolved in a solvent to form a polymer solution. This may be particularly desirable when solvent infiltration of the polymer composition is used. Solvents suitable for use in the polymer solution include any solvent that is compatible with the polymer composition and achieves the desired infiltration effect and that do not interfere in the polymerization or crosslinking process of the polymer. Examples of suitable solvents include toluene, benzene, water, hexane, methanol, ethanol, propanol, ether, acetone, chloroform, dichloromethane, tetrahydrofuran, etc. In certain embodiments, the polymer composition is present in the polymer solution in an amount in the range of from about 0.1% to about 100% by weight of the solution.

According to some embodiments, the particulates of the present invention may be formed by mixing a cementitious material and pozzolanic powder in a granulating machine, such as an Eirich mixer (e.g. Model RV02E, Eirich Machines, Inc., Gurnee, Ill.). An activator, which may comprise optional additives such as dispersants, water reducers, retarders, accelerators, etc., may be added during mixing. Mixing may continue until the mixture is granulated into generally round and spherical particulates generally having a diameter in the range of, for example, about 0.1 mm to about 2 mm. Then, the particulates may be placed in a container for aging, pre-curing, and/or curing at an elevated temperature. In some embodiments, curing at an elevated temperature may hasten the hydration of the cement, thus reducing the time necessary for the particulates to gain strength.

In some embodiments, the particulates are pre-cured at ambient conditions. For example, in some embodiments, the pre-cured particulates are pre-cured a pressure of about 1 atm or less. This pre-curing step allows the particulates to achieve a hardness necessary for them to sustain higher temperatures, pressures, and/or water exposure when the particulates are cured at temperatures about 200° F. or higher, or alternatively, about 230° F. or higher. In general, the particulates should be pre-cured until the particulates reach a crush strength of at least about 50 psi. In exemplary embodiments, pre-cured particulates are hard enough to withstand abrasion during handling and/or transport, and/or have enough cohesion to hold together in water. The particulates of the present invention may be pre-cured at relatively low temperatures, e.g., at temperatures as low as about 70° F., alternatively, at room temperature. In some embodiments, the pre-curing temperature may be in the range of about 70° F. to about 200° F.

In some embodiments, the curing temperature may be in the range of about 200° F. to about 600° F., alternatively in the range of about 200° F. to about 400° F. In general, cementitious materials may hydrate more quickly at temperatures above about 200° F. In some embodiments, the curing temperature may in the range of about 230° F. to about 600° F., alternatively in the range of about 230° F. to about 400° F. While not wishing to be limited by theory, it is thought that a curing temperature of about 230° F. is the desired curing temperature necessary to achieve crystallinity, e.g., at least some crystalline silicate phase, in the cured particulates. In some embodiments, crystallinity may be desirable because it tends to improve mechanical properties such as the hardness, durability, and strength of the particulates. The curing pressure may also be varied. In general the curing pressure should be sufficient to prevent condensed water from forming steam that escapes the particulates. At curing temperatures of about 200° F., the curing pressure may be about 1 atm. In some embodiments of the present invention, the curing temperature and pressure may be chosen to optimize the mechanical properties of the resulting particulates.

In some embodiments, the strength of the lightweight cement-based particulates may be increased by curing the particulates at higher temperatures. In general, the particulates may be cured by any suitable method, including the use of a kiln and/or a microwave heating source. In general, curing time may vary depending on factors such as the composition of the particulates, the curing equipment used, and the curing temperature. In some embodiments, the particles may be cured in a furnace/kiln to form a ceramic-like material. The temperature could be up to 600° F. Methods of making the particulates of the present invention may also comprise the step of coating the lightweight filler with coupling reagents. In general, the coupling reagents may strengthen the bond between the filler and the cementitious material In some embodiments, pre-cured particulates may be cured through hydrothermal processing. Hydrothermal processing may involve curing the particulates in water having a temperature in the range of about the boiling point of water to about 600° F. at a pressure of about 1 atm to about 1000 atm. In some embodiments, hydrothermal processing may further increase the crush strength of the particulates.

In another aspect, the present invention provides treatment fluids for use in subterranean formations. The treatment fluids generally comprise a base fluid and particulates that comprise a cementitious material and a filler material. In some embodiments, the particulates present in the treatment fluid have been produced through a process comprising forming particulates that comprise a settable composition comprising the cementitious material, the filler material, and an activator of the cementitious material; pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline structure. In some embodiments, particulates comprising a cementitious material and a filler material may be suspended in a treatment fluid which is introduced to a well bore that penetrates a subterranean formation. The particulates may be suspended in the treatment fluid by any suitable method as recognized by one skilled in the art with the benefit of this disclosure, including using a fracturing blender. The treatment fluids may be introduced to a well bore in connection with a variety of subterranean applications including, but not limited to, fracturing operations and gravel packing operations. As will be appreciated by a person of ordinary skill in the art with the benefit of this disclosure, the treatment fluids described herein may be used in fracturing or gravel packing operations, or in other subterranean applications to provide filtration media or the like.

In one aspect, the present invention provides methods of fracturing a subterranean formation comprising providing a subterranean treatment fluid that comprises a plurality of particulates comprising a cementitious material and a filler material, wherein the particulates are produced through a process comprising: forming particulates that comprise a settable composition that comprises the cementitious material, the filler material, and an activator of the cementitious material; pre-curing the particulates until the particulates reach a crush strength of about 50 psi or greater; and curing the pre-cured particulates at a temperature in the range of about 230° F. to about 600° F., so that at least a portion of the particulates comprise a newly formed crystalline structure; and placing the subterranean treatment fluid in a portion of a subterranean formation at a pressure sufficient to create or enhance one or more fractures in the portion of the subterranean formation.

The base fluids utilized in the subterranean treatment fluids of the present invention can be any fluid suitable for use as a base fluid in fracturing or gravel packing operations. Suitable base fluids include, but are not limited to, water, aqueous gels, viscoelastic surfactant gels, oil gels, gases, liquefied gases, liquefied hydrocarbons, emulsions, and combinations thereof. Suitable aqueous gels are generally comprised of water and one or more gelling or viscosifying agents. Optionally, the aqueous gel further may comprise a crosslinking agent for crosslinking the gelling agent and further increasing the viscosity of the fluid. Suitable viscoelastic surfactant gels may comprise a viscoelastic surfactant and water. Suitable emulsions can be comprised of two immiscible liquids such as an aqueous liquid or gelled liquid and a hydrocarbon. Suitable water used in the base fluids can be fresh water, salt water (e.g., water containing one or more salts dissolved therein), brine (e.g., saturated salt water), seawater, or any other aqueous liquid that does not adversely affect other components in the subterranean treatment fluid. The base fluid may also be foamed or unfoamed as desired for a particular application and may include, for example, air, carbon dioxide, and/or nitrogen.

According to some embodiments in which a treatment fluid comprises a gelling agent, a variety of gelling agents may be used, including, but not limited to, hydratable polymers that contain one or more functional groups such as hydroxyl, carboxyl, sulfate, sulfonate, amino, or amide groups. Suitable gelling agents typically comprise polymers, synthetic polymers, or a combination thereof. A variety of gelling agents may be used in conjunction with the methods of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In some embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, and cellulose derivatives, such as hydroxyethyl cellulose. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued to Weaver et al., the disclosure of which is incorporated herein by reference. Suitable gelling agents that may be used in conjunction with the methods of the present invention may be present in the treatment fluid in an amount in the range of about 0.01% to about 5% by weight of the water therein. In some embodiments, the gelling agents may be present in the treatment fluid in an amount in the range of about 0.01% to about 2% by weight of the water therein.

In some embodiments, crosslinking agents may be used to crosslink gelling agent molecules to form crosslinked gelling agents. Crosslinkers typically comprise at least one metal ion that is capable of crosslinking molecules. Examples of suitable crosslinkers include, but are not limited to, zirconium compounds (such as, for example, zirconium lactate, zirconium lactate triethanolamine, zirconium acetylacetonate, zirconium citrate, and zirconium diisopropylamine lactate); titanium compounds (such as, for example, titanium lactate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. An example of a suitable commercially available zirconium-based crosslinker is "CL-24™" available from Halliburton Energy Services, Inc., Duncan, Okla. An example of a suitable commercially available titanium-based crosslinker is "CL-39™" available from Halliburton Energy Services, Inc., Duncan, Okla. Suitable crosslinkers that may be used in conjunction with the methods of the present invention may be present in the treatment fluid in an amount sufficient to provide, inter alia, the desired degree of crosslinking between gelling agent molecules. In some embodiments of the present invention, the crosslinkers may be present in the treatment fluid in an amount in the range about 0.001% to about 10% by weight of the water therein. In other embodiments of the present invention, the crosslinkers may be present in the treatment fluid in an amount in the range about 0.01% to about 1% by weight of the water therein. Individuals skilled in the art, with the benefit of this disclosure, will recognize the exact type and amount of crosslinker to use depending on factors such as the specific gelling agent, desired viscosity, and formation conditions.

In certain embodiments, gelled or gelled and cross-linked treatment fluids may also include internal delayed gel breakers such as enzyme, oxidizing, acid buffer, or temperature-activated gel breakers. The gel breakers cause the viscous treatment fluids to revert to thin fluids that can be produced back to the surface after they have been used to place particulates in subterranean fractures. The gel breaker used is typically present in the treatment fluid in an amount in the range of about 0.5% to about 10% by weight of the gelling agent. The treatment fluids may also include one or more of a variety of well-known additives, such as gel stabilizers, fluid loss control additives, clay stabilizers, bactericides, and the like.

To facilitate a better understanding of the present invention, the following examples of certain aspects of some embodiments are given. In no way should the following examples be read to limit, or define, the entire scope of the invention.

EXAMPLES

Example 1

A class C cement and a MICROSAND™ component, as listed in Table 2, were dry mixed in an Eirich mixer for about 15 minutes. The Class C cement that was used is commercially available from TXI Company (Midlothian Cement Plant, Midlothian, Tex.). The MICROSAND™ component, commercially available from Halliburton Energy Services Inc. of Duncan, Okla., was a fine $SiO_2$ powder with an average size of about 5 μm.

TABLE 2

| Components | Quantity (grams) |
| --- | --- |
| Class C Cement | 1000 |
| MICROSAND ™ | 1000 |

A cement friction reducer commercially available from Halliburton Energy Services, Inc., Duncan, Okla., under the trade name CFR-3™ was used as a dispersant and dissolved in water with a concentration of 3% (by weight). The solution was then pumped into the dry powder in the mixture while the mixer was kept running. The preferred rotor speed was 1300 rpm with a fast pan setting. After adding 38% by weight of cement, ("bwc") of the CFR-3™ solution, round particulates of a desired size formed and mixing was stopped. Those of ordinary skill in the art would understand how to optimize mixing conditions to vary the mean distribution of particle size. The particulates (sometimes known in the art as "green particles") were allowed to harden to sufficient strength before further curing in water. The round particulates were then cured in water, at an elevated temperature of 200° F. (93° C.); the curing time was 2 days. The prepared cement particulates were sieved and tested for crush strength in accordance with the API 56 standard. The final particulates were sized between 12 and 20 meshes, with a typical round and spherical morphology. The roundness and sphericity were no less than 0.8, according to the API 56 standard. FIG. 1 shows an optical micrograph of cement particulates generally prepared according to the foregoing technique at 10× magnification.

The crush test results are shown in Tables 3 and 4. According to API RP56 crush test method, 12/20 sized (840-1680 μm) cement particulates generally prepared according to the foregoing technique had less than 10% crush fines at 3000 psi. The total fines quantity after 3000 psi crush test was 5.4%. The fines were mainly in the size of 20/40 (420-840 μm) and 40/70 (210-420 μm). After 4000 psi crushing, the amount of fines smaller than 70 mesh (<210 μm) was only 0.7% of the total sample quantity. This indicates that the particulates may fracture into relatively few pieces when they fail, which may be beneficial in preventing the space between the particulates from becoming blocked by fine particles. Comparatively, Ottawa sand has about 4% fines (12/20 mesh, 3000 psi) and about 6% fines (20/40 mesh, 4000 psi).

TABLE 3

Crush fines of 12/20 sized particulates (API RP56)

| Pressure (psi) | Fines between 20/40 meshes | Fines between 40/70 meshes | Fines smaller than 70 mesh | Total |
| --- | --- | --- | --- | --- |
| 2000 | 2.8% | 0.3% | 0.1% | 3.2% |
| 3000 | 4.5% | 0.7% | 0.3% | 5.4% |
| 4000 | 8.1% | 1.6% | 0.7% | 10.4% |

The crush fines results for the 20/40 sized cement particulates are shown in Table 4. After 5000 psi crush test, the total fines quantity was 7.7%, so the 20/40 cement particulates have crush strength above 5000 psi. The particulates also fracture into relatively few pieces when they fail under high pressure.

TABLE 4

Crush fines of 20/40 sized particulates (API RP56)

| Pressure (psi) | Fines between 40/70 meshes | Fines smaller than 70 mesh | Total |
|---|---|---|---|
| 3000 | 1.5% | 0.3% | 1.8% |
| 4000 | 3.1% | 0.8% | 3.9% |
| 5000 | 6.0% | 1.7% | 7.7% |

The bulk density for the 12/20 particulates was 1.26 g/cc. The bulk density for the 20/40 particulates was 1.27 g/cc. For comparison, the bulk density of 12/20 Ottawa sand is about 1.62 g/cc. So the bulk density of the cement particulates is about 22% lower than that of Ottawa sand. The specific gravity of the cement particulates was determined to be 2.27 (by He densitometry), compared with a specific gravity of 2.65 for sand.

Table 5 lists the conductivity of the 20/40 mesh cement particulates generally prepared according to the foregoing method, compared with the 20/40 mesh Ottawa sand. The testing conditions were (a) particulate density was 2 lb/ft$^2$, and (b) 180° F. 2% KCl (aq) flow for up to 141 hours in accordance with API RP61 "Recommended Practice for Evaluating Short Term Proppant Pack Conductivity."

TABLE 5

| | Conductivity | |
|---|---|---|
| | Closure Pressure 2000 psi | Closure Pressure 4000 psi |
| Cement Proppants Prepared as in Example 1 (20/40 Mesh) | 3438 mD-ft | 1503 mD-ft |
| Ottawa Sand (20/40 Mesh) | 4600 mD-ft | 2957 mD-ft | crush strength and long-term conductivity. The particulates had a roundness and sphericity greater than 0.7, according to the Krumbein and Sloss chart described in API 56. For 25 mL bulk volume, the particulates weighed about 31.1 g. Accordingly, the bulk density of the particulates was about 1.24 g/cc.

Table 6 lists the results of the API 56 crush testing procedure of the particulates in Example 2. As can been seen from the results, hydrothermal processing improved the crush strength of the particulates to above 5000 psi.

TABLE 6

Quantity of Fines Produced from Proppant Samples

| Pressure (psi) | 200° F. cured (12/20 Mesh) | Hydrothermally cured (12/20 Mesh) | Hydrothermally cured (20/40 Mesh) |
|---|---|---|---|
| 3000 | 4.9% | — | — |
| 4000 | 11.8% | 5.9% | — |
| 5000 | — | 8.3% | — |
| 6000 | — | — | 6.5% |

A long-term conductivity test was conducted on the 12/20 mesh hydrothermally cured particulate sample. Samples were loaded between two Ohio sand stone slabs in the conductivity cell (2 lb/ft$^2$). An aqueous salt solution (2% KCl, 180° F.) was flowed through the proppant pack for up to 141 hours. Table 7 lists the conductivity test results of the 12/20 mesh hydrothermally cured particulate sample. They are comparable with the 12/20 mesh Ottawa sand at 2000 psi and 4000 psi. As a comparison, the chemical SANDWEDGE™ NT was used to coat the original sample, so that the original sample would have less fines migration and degradation in the conductivity test cell.

TABLE 7

| | Pressure | | | | | | |
|---|---|---|---|---|---|---|---|
| | 2000 psi | | 4000 psi | | 6000 psi | | |
| Time (hrs) | 21 | 141 | 165 | 189 | 251 | 261 | 285 |
| Original Sample | 16999 | 14259 | 5442 | 5397 | 1171 | 528 | 578 |
| 3% SANDWEDGE ™ NT coated Sample | 15123 | 12206 | 5849 | 5636 | 1598 | 1417 | 553 |

Example 2

About 1 kg of Class H cement (TXI Company, Midlothian Cement Plant, Midlothian, Tex.,) and 1 kg of MICROSAND™ were added to a Model RV02E mixer available from Eirich Machines, Inc. of Gurnee, Ill. The mixer was operated at low rotor seed when 0.32 kg of CFR-3™ water solution (3.3 wt %) was added. Higher rotor speed was then used to mix the contents of the bowl. In about 60 minutes, particulates in the 12/40 range were formed. Thus obtained particulates were pre-cured for 12 hours at ambient conditions.

The particulates were then cured in a water bath at 200° F. for 2 days under atmospheric pressure. After drying, one portion of the particulates was tested for crush strength according to the API 56 standard. Another portion of the particulates was further hydrothermally cured in water at 400° F. and 2000 psi for 3 days. The hydrothermally cured sample was dried in a convection oven and then tested for Example 3

About 1 kg of Class H cement (TXI Company, Midlothian Cement Plant, Midlothian, Tex.), 0.8 kg MICROSAND™, and 0.2 kg Wollastonite (NYAD Minerals, Inc.) were added to a RV02E Eirich mixer. The mixer was operated at low rotor speed when 0.34 kg CFR-3™ water solution (3.3 wt %) was added. Higher rotor speed was then used to mix the contents of the bowl. In about 60 minutes, particulates in the 12/40 range were formed. Thus obtained particulates were precured for 12 hours at ambient conditions.

The particulates were then cured in a water bath at 200° F. for 2 days. After drying, one portion of particulates was tested for crush strength according to the API 56 standard. Another portion of particulates was further hydrothermally cured in water at 400° F. and 2000 psi for 3 days. The hydrothermally cured sample was dried in a convection oven and then tested for crush strength and long-term conductivity. The particulates have roundness and sphericity greater than 0.8, according to the Krumbein and Sloss chart described in API 56. For 25 mL bulk volume, the particulates weighed about 30.2 g. So the bulk density of the particulates was about 1.21 g/cc.

Table 8 lists the results of the API 56 crush testing procedure of the particulates in Example 3. Adding fibrous Wollastonite further improved the cement particulate's crush strength to above 7500 psi.

TABLE 8

| | Quantity of Fines Produced from Particulate Samples | |
|---|---|---|
| Pressure (psi) | 200° F. cured, (12/20) | Hydrothermally cured, (12/20) |
| 3000 | 3.2% | — |
| 4000 | 6.4% | — |
| 5000 | — | 3.2% |
| 6000 | — | 5.6% |
| 7500 | — | 7.1% |

A long-term conductivity test was conducted on the 12/20 mesh hydrothermally cured particulate sample. Samples were loaded between two Ohio sand stone slabs in the conductivity cell (2 lb/ft$^2$). An aqueous salt solution (2% KCl, 180° F.) was flowed through the proppant pack for up to 285 hours. Table 9 lists the conductivity test results of the 12/20 mesh hydrothermally cured particulate sample. The conductivity of this sample was about 30% better than 12/20 mesh Ottawa sand at pressures up to 4000 psi and comparable with 12/20 mesh Ottawa sand at 6000 psi. SANDWEDGE™ NT was coated onto the original sample.

TABLE 9

| | Pressure | | | | | |
|---|---|---|---|---|---|---|
| | 2000 psi | | | 4000 psi | | 6000 psi |
| Time (hrs) | 3 | 92 | 115 | 139 | 163 | 188 | 216 |
| 1% SANDWEDGE ™ NT coated sample | 23887 | 21168 | 20517 | 8430 | 8086 | 1637 | 1564 |

Example 4

Lightweight cement-based particulates comprising a geopolymer cementitious material and hollow microspheres were prepared by first dry blending 1560 grams of calcined metakaolin with 240 grams of 3M Glass Bubbles (HGS 18000) in an Eirich mixer (Eirich Machines, Inc. of Gurnee, Ill.) running at 80 Hz (1300 rpm) with pan speed set to high for 30 minutes. The material was then agglomerated through the slow addition of a binder solution comprising 1:1 weight-percent of 40% sodium silicate and 14 N sodium hydroxide ("NaOH") in water. About 400 grams of binder solution were added to the blender though a 1 mm diameter tube at 50 mL/min, while continuing to mix at 1300 rpm and high pan speed. The rate of addition of the binder solution was reduced to 15 mL/min and an additional 210 grams of binder solution were added while keeping a close watch on particle size growth. When the powder mixture is significantly wet and close to form particles, the rate of binder solution was reduced to prevent over addition of water and quick formation of particle agglomerates. After the mixture took the shape of particles, the particles were tumbled on low speed for 5 minutes to increase sphericity and roundness. The particles were then removed from the blender pan and allowed to harden at room temperature for 2 hours. The particles were transferred to glass jars and cured at 100° C. for 48 hours, after which the particles were sieved to obtain mostly 20/40 and 12/20 mesh spherical particulates.

Figure 2:
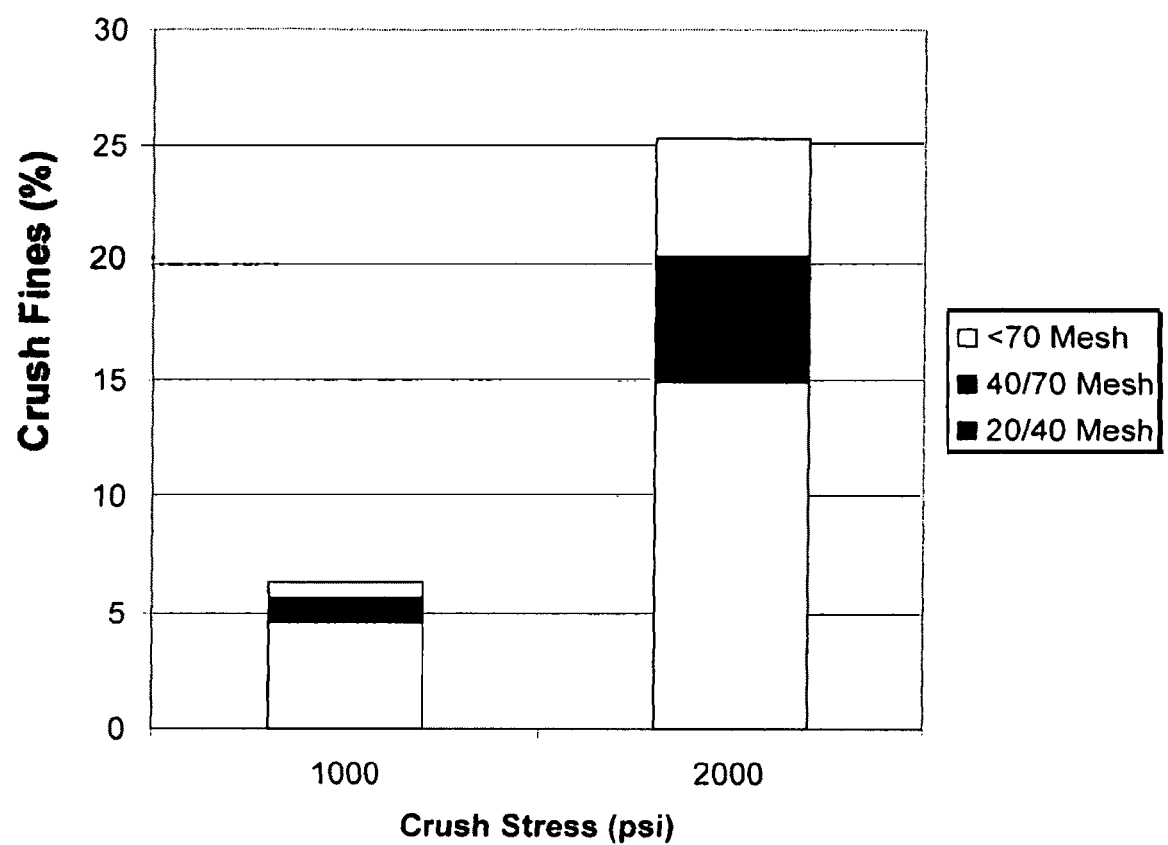
FIG. 2 illustrates crush strength data for particulates that represent an embodiment of the present invention.
Figure 3:
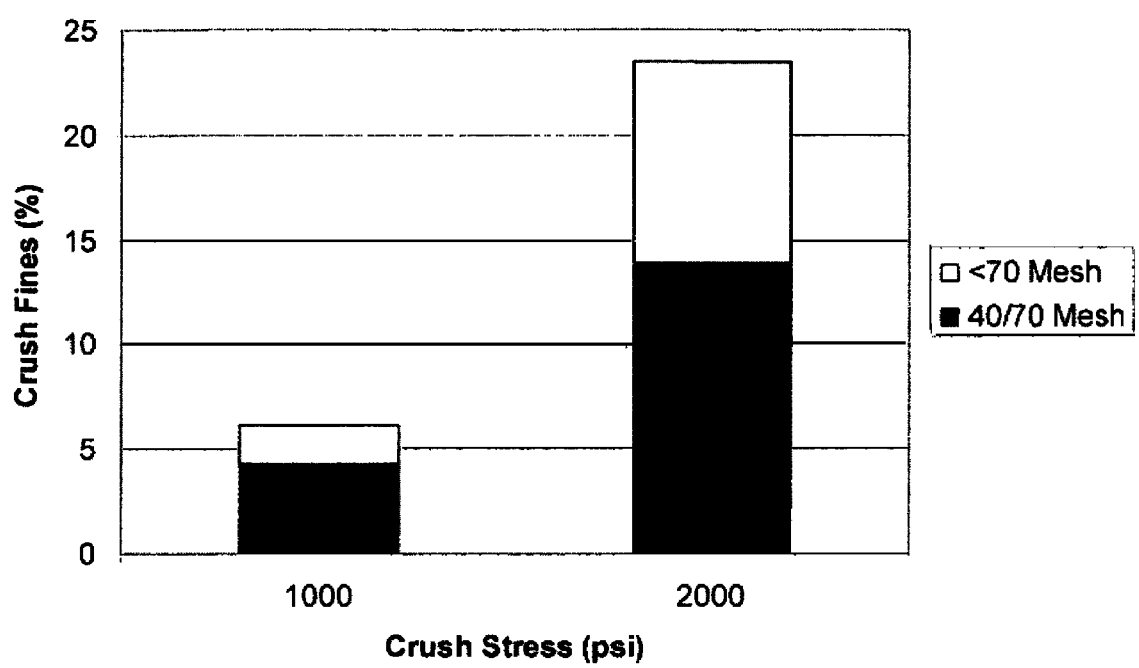
FIG. 3 illustrates crush strength data for particulates that represent an embodiment of the present invention.

The crush strength and sphericity and roundness of the particulates were measured according to procedure outlined in the API RP-56 publication. The sphericity and roundness of the particulates were determined to be greater than 0.7. FIGS. 2 and 3 show the crush strength of the particulates. The 12/20 mesh particulates had a crush strength of 1000 psi with 6.5% fines. The average weight of 25 mL of particulates was 23.32 grams (bulk density: 0.93 g/cc). Particulates were also characterized for microstructural information by ESEM and XRD. It is believed that the particles prepared in this way would be suitable for use in gravel packing operations.

Example 5

Figure 4:
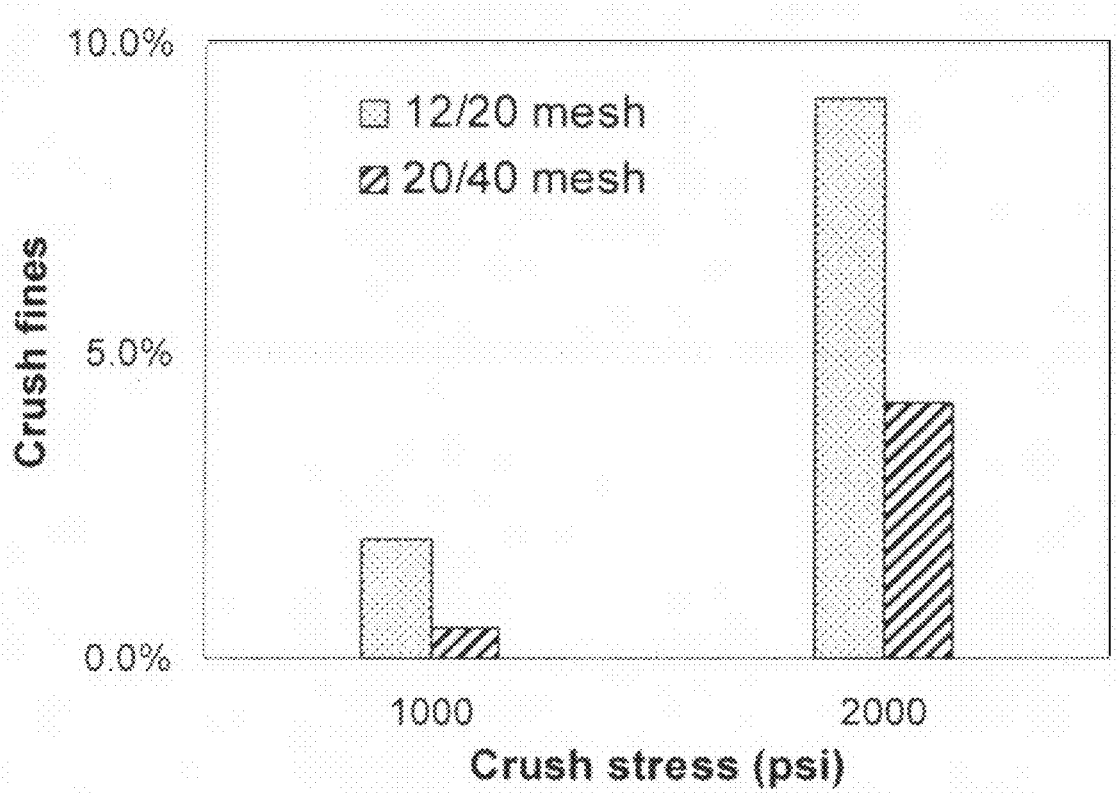
FIG. 4 illustrates crush strength data for particulates that represent an embodiment of the present invention.

Lightweight cement-based particulates were prepared by dry blending 1000 grams of MICRO MATRIX® cement (Halliburton Energy Services, Inc. of Duncan, Okla.) with 200 grams of 3M Glass Bubbles (HGS 18000) in an Eirich mixer. A 360 mL aqueous solution of superplasticizer (Megapol, Handy Chemicals, Ltd., 120 Boul, DE L'Industrie, Candiac, (Quebec) Canada, J5R 1J2) with an active concentration of 1.6% by weight was added to hydrate the cement and to form a strong binding agent. The resulting particulates were determined to have roundness and sphericity of about 0.9 according to the API 56 standard. After curing the particulates in water at 200° F. for 3 days, the particles were dried. The particulates were then determined to have a specific gravity of 1.64 (by He pycnometry) and a crush strength of more than 2000 psi. The results of the crush stress test performed on the particles are shown in FIG. 4.

Example 6

In order to test the effect of infiltrated polymer on the strength of particulates, the crush strengths of some polymer-infiltrated particulates were measured using the API RP56 method in a 2 inch diameter crush cell. Particulate samples with a bulk volume of 25 mL were used to keep the constant particulate thickness of 0.5 inches. After crushing, the particulates were sieved and weighed for fines and crush strength. Stress-displacement data were also collected for stiffness analysis.

First, metakaolin geopolymer composite particulates were prepared from calcined metakaolin (average particulate size 4 micron) and MICROSAND™ (average size about 5 microns) were mixed in 3:4 ratio. A 1:1 wt % solution of 40% sodium silicate and 14 N sodium hydroxide ("NaOH") in water was used as a binder. The material was agglomerated in an Eirich mixer at 1300 rpm and at high bowl speed. The amount of binder used was 25% the weight of the ceramic powder. In this embodiment, the metakaolin cementitious material is thought to react with sodium silicate and sodium hydroxide and form a geopolymer phase that binds that MICROSAND™ filler material. After agglomeration the particles were cured at 100° C. for 24 hours in an air oven. The material was then sieved to obtain mostly 12/20 mesh spherical particulates.

To carry out infiltration and in-situ polymerization the metakaolin geopolymer composite particulates were initially evacuated for 1 hour at 5 mmHg vacuum in a flask. Monomeric methylmethacrylate (MMA) containing a polymerization initiator, 1% by weight of azobisisobutyronnitrile (AIBN), was then introduced on top of the geopolymer particulates. The system was further kept under 5 mmHg vacuum for 15 minutes. The excess amount of the monomeric MMA was filtered off on a Buckner funnel, and the monomeric MMA soaked particulates were then transferred to a closed bottle. The in-situ polymerization of infiltrated MMA monomers was initiated by heating the bottle to 60° C. for 12 hours.

Figure 5:
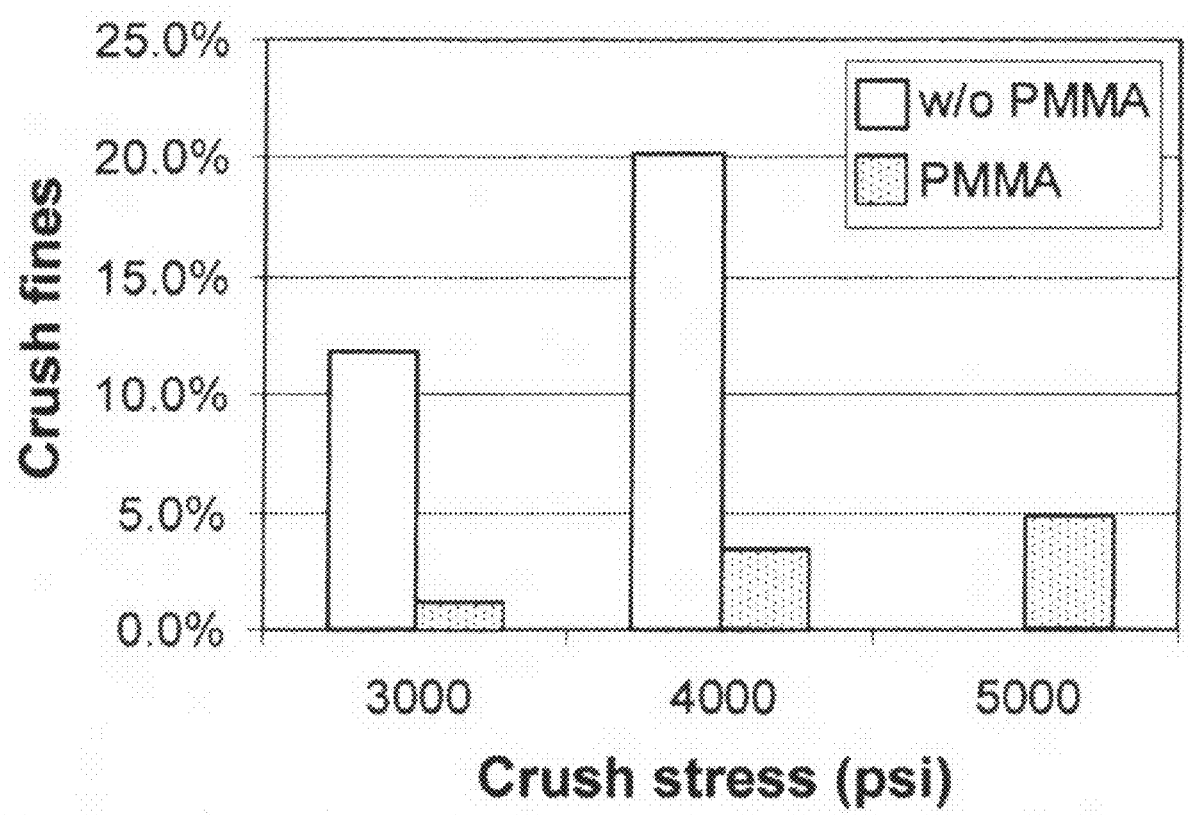
FIG. 5 illustrates crush strength data for particulates infiltrated with polymer.

The bulk density of the neat geopolymer particles was ~29 g/25 mL. After infiltration of polymeric methylmethacrylate ("PMMA"), the bulk density was (28.8±1.1) g/25 mL. As shown in FIG. 5, in-situ polymerization enhanced the crush strength of the geopolymer particulates from less than 3000 psi to more than 5000 psi. Table 10 shows the stress-displacement data for the geopolymer particulates.

TABLE 10

Displacement of Geopolymer Proppant Pack Under Stress

| Stress | No PMMA | In-situ Polymerized PMMA |
|---|---|---|
| 3000 psi | 0.065" | 0.063" |
| 4000 psi | 0.083" | 0.078" |

Example 7

Cement particulates were prepared from Class A cement (average particulate size 18 micron) and metakaolin (average particulate size 4 micron) mixed in 1:1 ratio in an Eirich mixer (RV02E). First, the two components were mixed at 1300 rpm with pan speed at high for 30 minutes. The material was then agglomerated by the slow addition of a plasticizer, CFR-3™ water solution (3.3 wt %), commercially available from Halliburton Energy Services, Duncan, Okla., to the agitated powder mixture. The amount of binder used was 30% by weight of the ceramic powder. The particulates produced were cured at 200° F. in water for 48 hours and then dried in open air oven at 200° F. for an additional 48 hours. Infiltration and in-situ polymerization were carried out as described in example 6.

Figure 6:
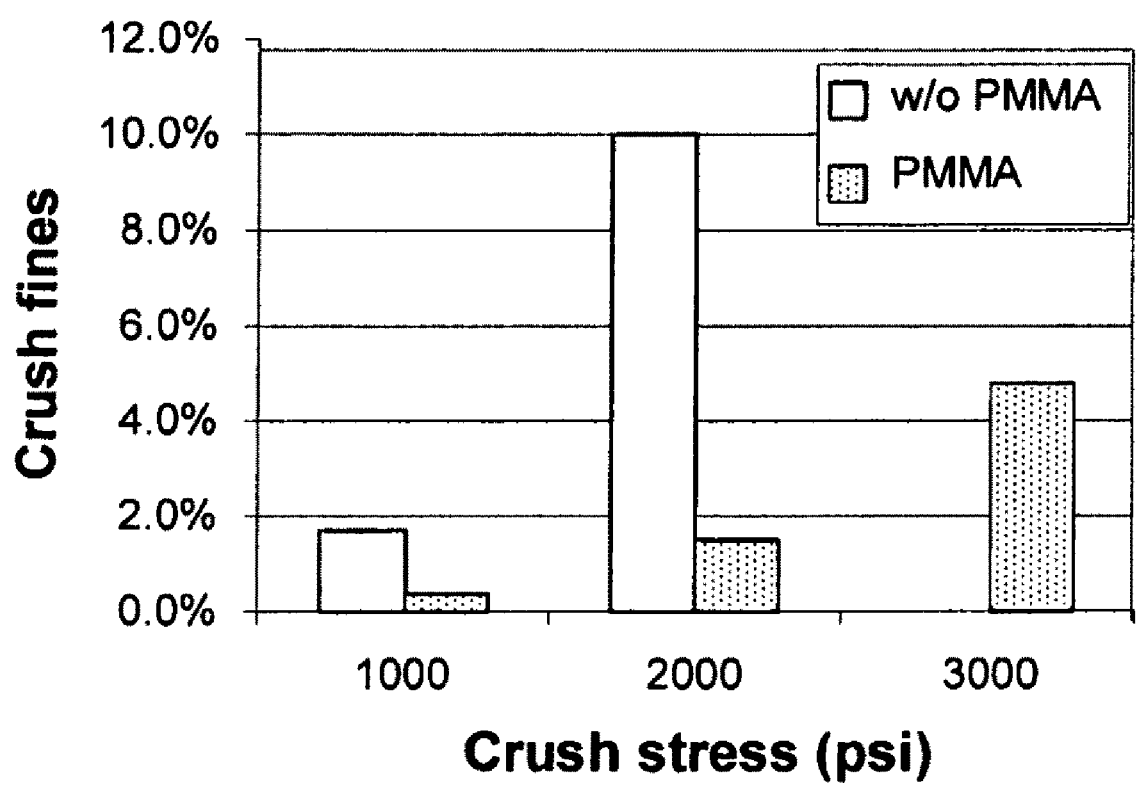
FIG. 6 illustrates crush strength data for particulates infiltrated with polymer.

The bulk density of the neat cement particulates was (26.1±0.5) g/25 mL. After in-situ polymerization of the MMA, the bulk density was (24.5±0.1) g/25 mL. As shown in FIG. 6, in-situ polymerization enhanced the crush strength of the cement particulates from less than 2000 psi to more than 3000 psi. Table 11 shows the stress-displacement data for the cement particulates.

TABLE 11

Displacement of Cement Proppant Pack Under Stress

| Stress | No PMMA | In-situ Polymerized PMMA |
|---|---|---|
| 1000 psi | 0.09" | 0.065" |
| 2000 psi | >0.1" | 0.098" |

Example 8

Figure 7:
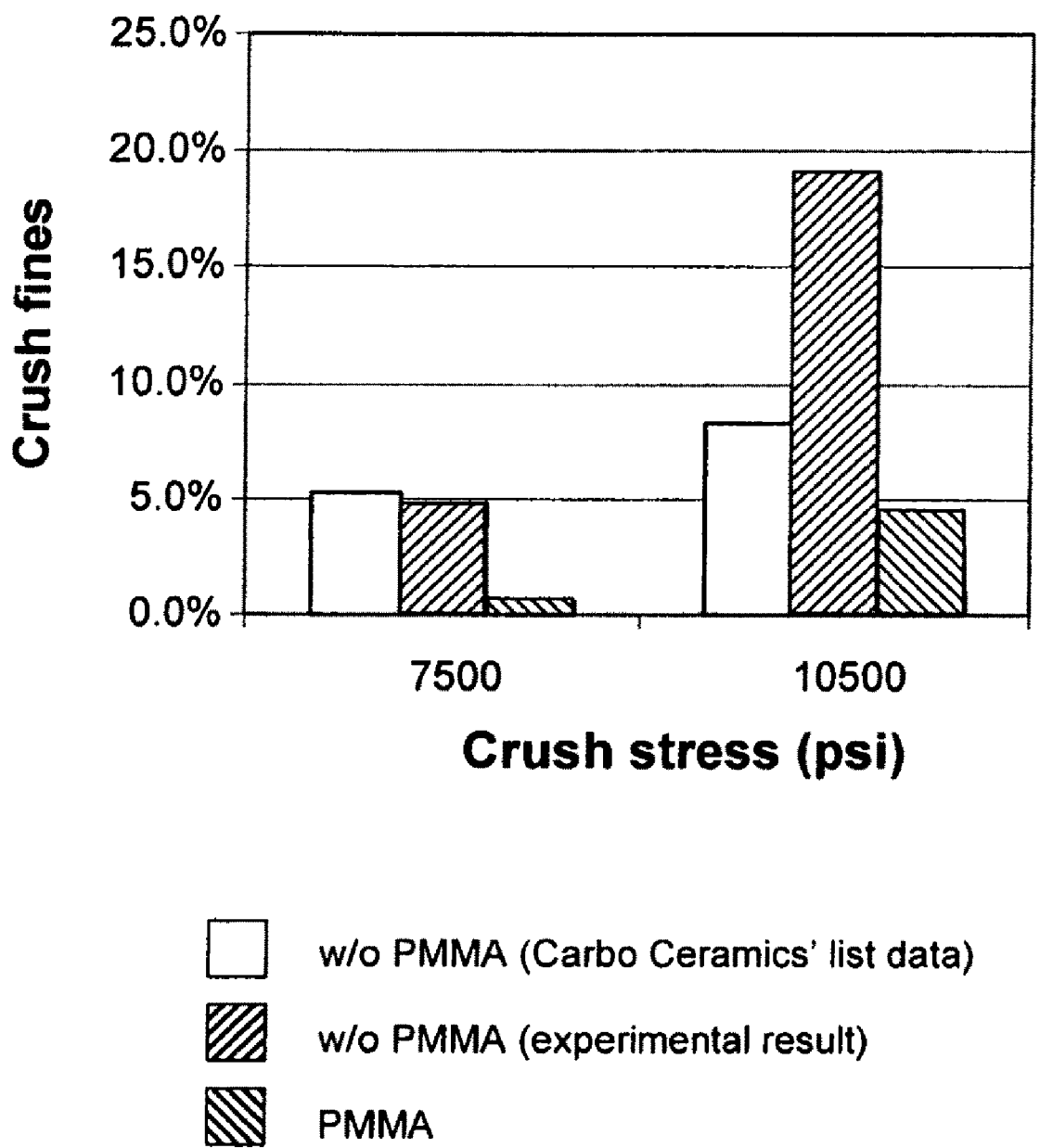
FIG. 7 illustrates crush strength data for commercially available particulates infiltrated with polymer. Particulates of the present invention may also be infiltrated with polymer.
Figure 8:
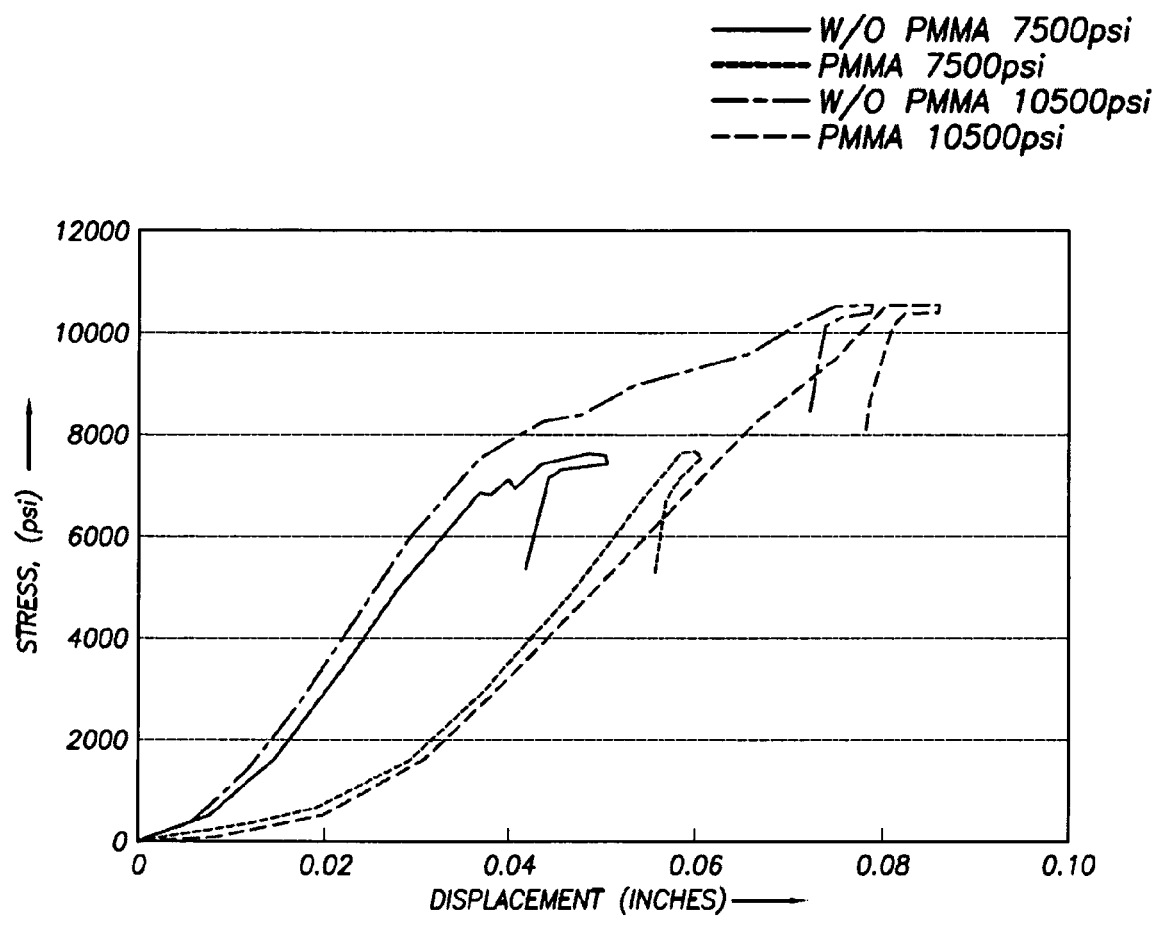
FIG. 8 illustrates crush strength data for commercially available particulates infiltrated with polymer. Particulates of the present invention may also be infiltrated with polymer.

To illustrate how particulates of the present invention may be strengthened through infiltration with a polymer, an experiment was performed to show how commercially available particulates may be strengthened by polymer infiltration. Particulates available under the trade name CARBOLITE®, commercially available from Carbo Ceramics, were used as received. The mesh size of the particulates was 20/40. Infiltration by in-situ polymerization was carried out as described in Example 6. The bulk density of the particulates was (40.3±0.1) g/25 mL. After in-situ polymerization of the MMA, the bulk density was (37.8±0.1) g/25 mL. As shown in FIG. 7, although un-infiltrated commercial CARBOLITE® proppant was not tested as having as high a strength as indicated on Carbo Ceramics' list data under 10500 psi, in-situ polymerization of the particulates enhanced the crush strength of the ceramic particulates significantly. The failure mode of the particulates was also altered by the infiltrated PMMA. Without infiltration and polymerization, the ceramic particulates fail catastrophically above 7000-8000 psi, as shown in FIG. 8 by the inflection at such pressure for 10500 psi. With infiltration and polymerization, however, this inflection of failing disappeared, there were less particles failing, and the particles failed individually rather than catastrophically. The lower density of the infiltrated sample may be the result of the polymerization of some monomer on the surface of the particulate thus increasing the volume and decreasing the weight of the particulates.

Example 9

The cement particulates in this example were made with 900 g of Class H cement, 200 g HGS18000 hollow glass beads, 450 g MICROSAND™, and 90 g NYGLOS® M3 wollastonite fibers. The powder was granulated with 290.3 g Megapol (Handy Chemicals, Ltd., 120 Boul, DE L'Industrie, Candiac, Quebec, Canada) aqueous solution (2 wt % active Megapol) in the Eirich mixer. After granulation the particles were pre-cured at room temperature overnight, and then cured at 300° F. hydrothermally. After the curing, the particles were sieved and the 20/40 portion was crushed at 4000 psi with crush fines of 7.1%. The bulk density was around 0.9 g/cc (22.6 g for 25 mL).

Four hundred grams of the particulates were coated with Chem-O-Plex (Fritz Industries, Inc., Mesquite, Tex.) in a Glatt-Powder-Coater-Granulator ("GPCG") in a Wuster coating process. Chem-O-Plex contains 40% copolymer of styrene and acrylate latex in aqueous emulsion form. This material was diluted to 20% concentration to reduce its viscosity and to make it suitable for coating. Three coated samples were periodically drawn out of a chamber containing 8, 11 and 14 wt % coating respectively.

The coated proppant particles were subjected to an acid solubility test (API RP 56) using 15% HCl at 150° F. for 30 min. The result of the testing is summarized in Table 12. This coating proved very effective in preventing the solubility of cement proppants in acid solution. The Chem-O-Plex coating may further be crosslinked with amines so that it can be made more resilient to water attack and swelling.

TABLE 12

| | Uncoated Cement Proppant | Proppant coated with Chem-O-Plex 8 wt. % coating | Proppant coated with Chem-O-Plex 11 wt. % coating | Proppant coated with Chem-O-Plex 14 wt. % coating |
| --- | --- | --- | --- | --- |
| Solubility | 96.31% | 2.32% | 1.78% | 1.78% |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "about a to about b," or, equivalently, "approximately a to b," or, equivalently, "approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of fracturing a subterranean formation comprising:
   providing a subterranean treatment fluid that comprises a plurality of particulates that comprise a cementitious material and a filler material, wherein the particulates are produced through a process comprising
      forming particulates that comprise a settable composition comprising
         the cementitious material,
         the filler material, and
         an activator of the cementitious material;
      pre-curing the particulates until the particulates reach a crush strength of about 50 psi or greater; and
      curing the pre-cured particulates at a temperature in the range of about 230° F. to about 600° F., so that at least a portion of the particulates comprise a newly formed crystalline structure; and
   placing the subterranean treatment fluid in a portion of a subterranean formation at a pressure sufficient to create or enhance one or more fractures in the portion of the subterranean formation.

2. The method of claim 1 wherein forming particulates that comprise a settable composition comprising a cementitious material, a filler material, and an activator of the cementitious material comprises:
   combining the components comprising the cementitious material, the filler material, and the activator of the cementitious material to form a settable composition; and
   forming a plurality of particulates from the settable composition.

3. The method of claim 1 wherein forming particulates that comprise a settable composition comprising a cementitious material, a filler material, and an activator of the cementitious material comprises:
   combining the components comprising the cementitious material, the filler material, and a granulating agent to form a un-activated cement blend;
   forming a plurality of particulates from the un-activated cement blend; and
   contacting the un-activated cement blend particulates with the activator of the cementitious material.

4. The method of claim 1 wherein the cementitious material comprises a hydraulic cement and the activator of the cementitious material is water.

5. The method of claim 1 wherein the cured particulates have a specific gravity in the range of about 0.8 to about 3.5.

6. The method of claim 1 wherein the pre-cured particulates are cured at a temperature in the range of about 230° F. to about 400° F.

7. The method of claim 1, wherein the cementitious material comprises a hydraulic cement selected from the group consisting of a Portland cement, a pozzolanic material, a fly ash, a slag, calcined metakaolin, a phosphate cement, a gypsum cement, an aluminous cement, a silica cement, an alkaline cement, a high content alumina cement, a magnesium oxide cement, an acid resistant silicate cement, an oxysalt cementitious system, a silico phosphate cement, a glass phosphate cement, and any mixture thereof.

8. The method of claim 1 wherein the filler material comprises a material selected from the group consisting of a mineral compound, a silica, an alumina, a bauxite, a talc, a zeolite, a feldspar, a kaolin, a slag, a hollow glass bead, a glass fiber, a zeolite, an organic compound, a nut shell, a carbon fiber, a pozzolanic power, and mixtures thereof.

9. The method of claim 1 wherein the filler material comprises fly ash.

10. The method of claim 1 wherein the filler material comprises a lightweight filler material selected from the group consisting of a hollow mineral glass sphere, a hollow cenosphere, a hollow microsphere, wood dust, a walnut hull, a rice husk, an expanded perlite, a fly ash, and mixtures thereof.

11. The method of claim 1 wherein the cured particulates have an average diameter of about 150 micrometers to about 2.5 millimeters.

12. The method of claim 1 wherein forming the cured particulates have a sphericity of 0.7 or higher.

13. The method of claim 1 wherein the cured particulates have an API crush strength of higher than 5000 psi.

14. The method of claim 1 wherein the particulates further comprise high surface area silica.

15. The method of claim 1 wherein the particulates further comprise an admixture.

16. The method of claim 1 wherein the particulates are at least partially coated with an inert material.

17. The method of claim 1 wherein the particulates are at least partially coated with a resin.

18. The method of claim 1 wherein the step of pre-curing the particulates is at a temperature in the range of about 70° F. to about 230° F.

19. The method of claim 1 wherein the particulates are suspended in the subterranean treatment fluid.

20. The method of claim 1 wherein the particulates are deposited in the one or more fractures.

* * * * *